June 18, 1963 T. E. GAUTHIER ETAL 3,094,122
FLEXIBLE CANNULA AND INTRAVENOUS NEEDLE COMBINED
Filed Jan. 18, 1961 2 Sheets-Sheet 1

David J. Massa
Theophile E. Gauthier
INVENTORS

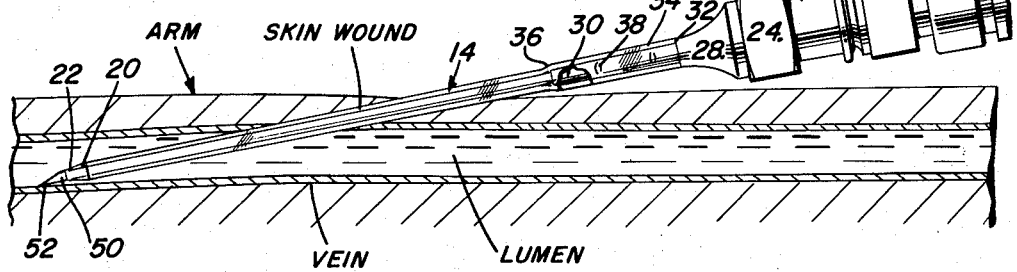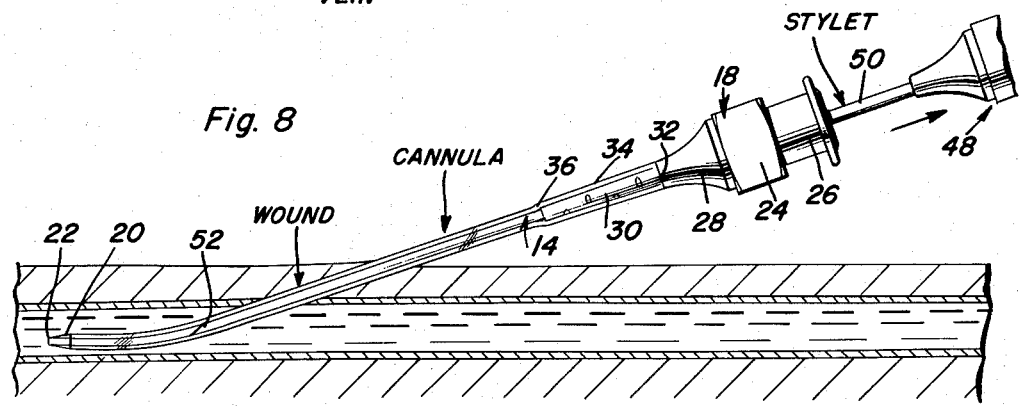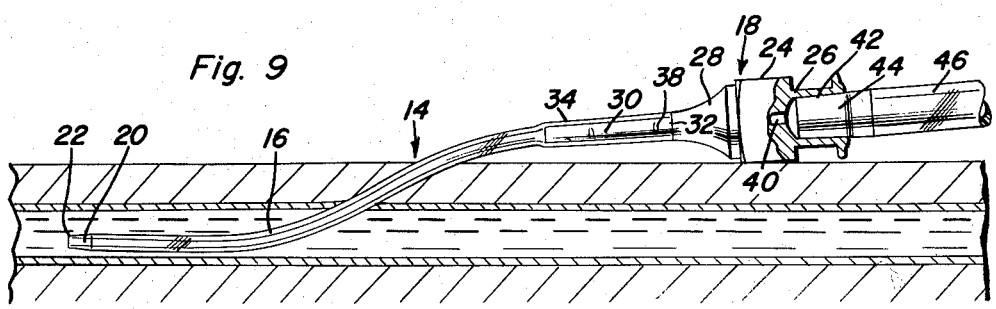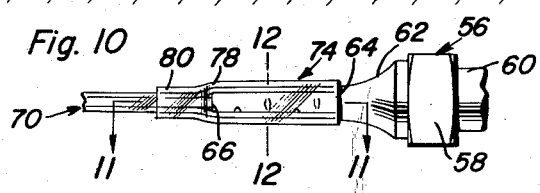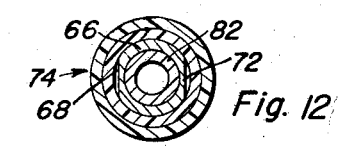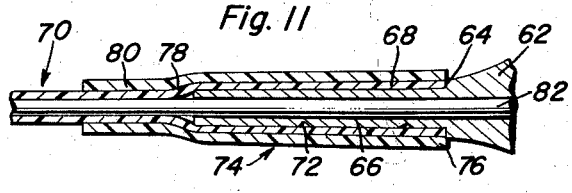

United States Patent Office 3,094,122
Patented June 18, 1963

3,094,122
FLEXIBLE CANNULA AND INTRAVENOUS
NEEDLE COMBINED
Theophile E. Gauthier, 1210 4th St. NW., Rochester,
Minn., and David J. Massa, 787 Woodhill Road, Mansfield, Ohio
Filed Jan. 18, 1961, Ser. No. 83,475
8 Claims. (Cl. 128—221)

This invention relates, generally speaking, to intravenous administration of fluids and pertains, more particularly, to an ingenious instrumentality or device which fulfills a long felt need which has been sought after for years on end.

More specifically the present invention has to do with a comparatively simple easy-to-use device which is characterized by a conventional-type rigid intravenous needle and a complemental flexible non-toxic needle, the latter being cooperatively usable in combination with the rigid needle and, what is significantly important, being usable as an independent instrument.

Persons conversant with the field of endeavor herein under advisement are aware of the over-all problem and will recall that the hollow metal needle was invented and came into use many years ago. Since that time there have been innumerable variations of the metal needle in futile attempts to discover an unbreakable, non-puncturing (without point), corrosive-resistant, non-toxic, flexible instrument that, once introduced into a patient, would remain safely in place for varying periods of time. Just to mention a few variations there are Quincke needles, the Lewisohn, the Schimmel Iridio-Platinum needle, the Lemmon needle, the Tuohy, the Hingson-Edwards Malleable needle, Patents 2,389,355 and 2,937,643 and many others too numerous to dwell upon.

The instant invention has been devised to advance the art and to satisfy an urgent need for a flexible non-toxic needle. The latter, because of its flexibility may be allowed to stay in the lumen of a preselected vein for a long time (from a day to two weeks) contingent on site, the size of the vein and the individually evaluated patient's tolerances and different tissue responsiveness. It follows that the flexible needle virtually eliminates the need for repetitional venipunctures and consequently affords the patient, ever-needed comfort, much to the desires of all concerned.

When this flexible needle, essentially a clear plastic tube with a prerequisite novel fitting, was introduced it was a revolutionary new instrument that fulfilled all the prerequisites of an instrument that had been sought after since time immemorial. This plastic tube or cannula is flexible, non-puncturing (after insertion) unbreakable, non-toxic, non-corrosive, autoclavable and yet, extremely simple in construction and reliably easy to use. A clear plastic tube or cannula may now be inserted directly into a patient, through a perforating skin wound the same size as the outside diameter of the tube itself. The rigid metal needle or stylet needs only to be removed and discarded, and the plastic cannula or needle is ready to be used again.

As will be hereinafter evident the above-named flexible needle or cannula is highly desirable and efficacious in the intravenous administration of fluids. When in properly located position it affords the patient freedom of movement even when, for example, the needle is located over or in proximity to a joint.

Then, too, it will be evident that the significant reduction of frequently repeated venipunctures, aside from the comfort afforded the patient, effects an appreciable saving of valuable time to the physician as well as expense to the patient and the hospital.

Briefly, the unique and improved dual needle construction is characterized chiefly by an elongated non-toxic flexible cannula which, because of its conformable flexible properties may be safely permitted to extend into and remain in the lumen of a preselected vein for a relatively long period of time, said cannula having a distal end which facilitates advancement of a prescribed portion well into the lumen and also having a proximal end equipped with an available axially bored fitting, said fitting having a rigid hub-like body with suitable surfaces affording the user an accessibly reliable grip and enabling the user to manually apply end thrust pressure sufficient to advance said distal end to its most advantageous and gainful place of lodgement in the lumen.

Novelty is also predicated on the cannula above referred to and the combination therewith of a conventional type intravenous needle embodying a hollow rigid stylet of a length greater than the length of said cannula and having a distal leading end pointed and provided on its opposite trailing end with a rigid fitting independent of said first named fitting, said cannula being sheathed and snugly but removably fitted over said stylet with the leading pointed end of said stylet projecting a predetermined distance beyond the adjacent distal end of said cannula.

It may be added here that the idea of passing a cannula or tube through the lumen or bore of a rigid needle is old and has been used for many years. An obvious objection to this now discarded technique and means, aside from being difficult to cope with, is that once the outside or rigid needle is withdrawn to leave the flexible plastic tube in the patient, the puncture wound is much larger than the outside diameter of the tube and this results in an oversize opening which permits leakage of blood and fluids and for introduction of infection. As will be hereinafter appreciated the instant adaptation is distinct and different both structurally simple and reliable and much easier to use. To this end the assembled instrument is inserted in the vein as an ordinary needle and blood is allowed to pass through the rigid inner stylet needle to determine when it is properly located in the vein. Then the inner stylet or needle is completely withdrawn and the outer flexible plastic cannula is allowed to remain in the vein the desired length of time. The herein described plastic tube provides a smooth cannula which, as practice has shown, does not promote formation of a clot. Because of its flexibility, the movement of the patient will not cause it to be forced out of the vein as will almost certainly happen with a rigid or steel cannula.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
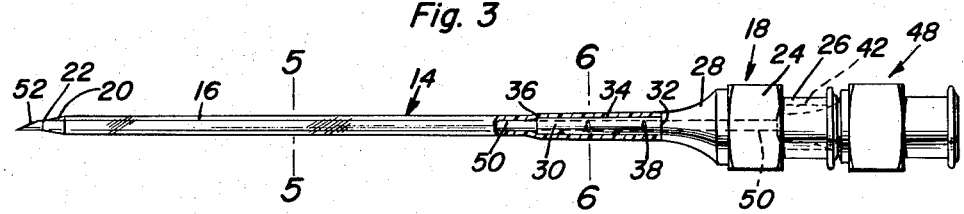
FIG. 3 is a view in elevation and section showing the assembled ready-to-use instrumentality, that is, with the two needles combined and readied for use.
Figure 4:
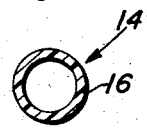
FIG. 4 is a cross-section on the line 4—4 of FIG. 2.
Figure 5:
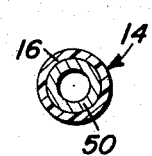
Figure 6:
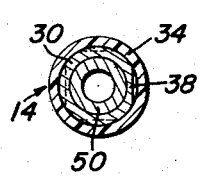

FIGS. 5 and 6 are similar sections but taken on the lines 5—5 and 6—6, respectively of FIG. 3.

FIG. 7 is a view with the patient's arm and vein in section and with the over-all instrument in ready-to-serve position with both needle ends in the lumen of the vein.

FIG. 8 is a view based on FIG. 7 and showing the inner intravenous needle being withdrawn.

FIG. 9 is a similar view with parts appearing in section and elevation and showing the flexible needle or cannula in its final position and also showing a fluid conduit or hose separably connected with the fitting.

FIG. 10 is a fragmentary view in elevation showing a modification; namely, an added sleeve at the juncture of the plastic tube and its attached fitting.

FIGS. 11 and 12 are sections on the lines 11—11 and 12—12 respectively of FIG. 10.

Figure 1:
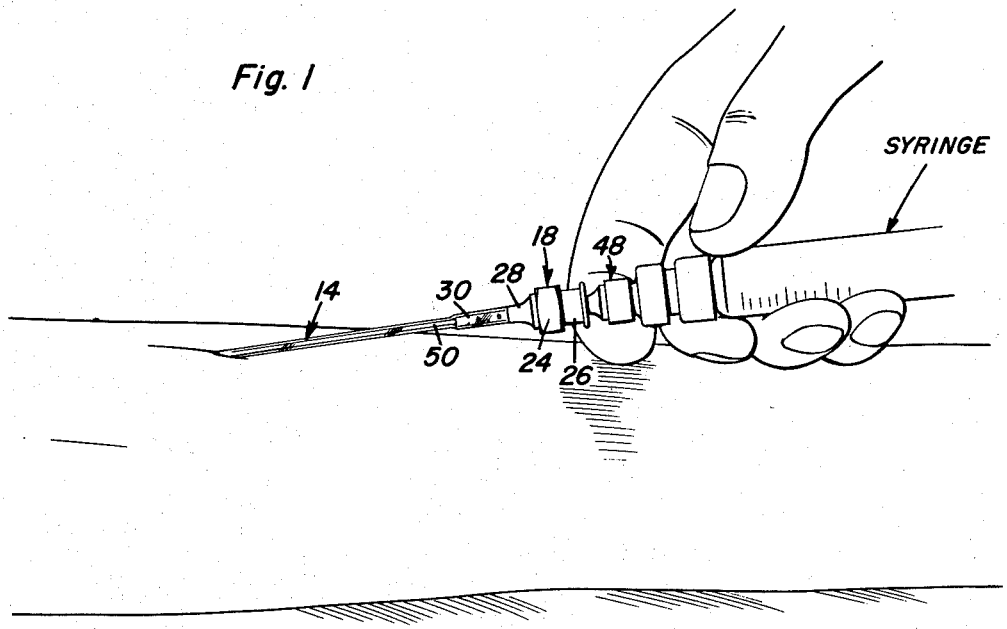
FIG. 1 is a view illustrating the improved adaptation or instrumentality, including syringe and showing the initial step of making the injection.
Figure 2:
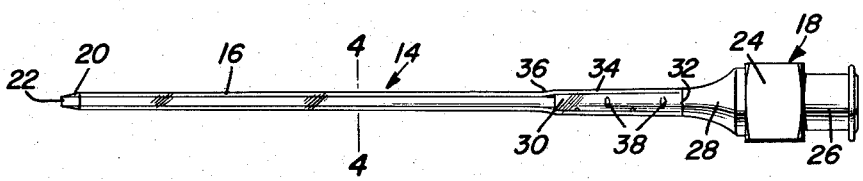
FIG. 2 is a view in side elevation of the component part heretofore and hereinafter referred to as either a flexible needle, plastic tube or cannula.

With reference now to the details of the invention it will be noted that the flexible needle or cannula is denoted (FIG. 2) by the numeral 14. This part is made up of two interconnected components; namely, the flexible non-toxic clear plastic elongated tube 16 and the improved Luer-type rigid metal or equivalent fitting 18. It should be noted that the distal or forward end of the tube is gradually tapered and thus reduced in cross-section to provide a truncated conical point 20 terminating in a feather-edge lip 22. The fitting comprises a flat-faced grippable body 24 having a reduced flanged adapter neck 26 on its rearward side. The forward side is provided with an integral generally conical member 28 having a relatively short tubular shank 30 axially connected thereto and extending therefrom beyond the shoulder 32.

The rearward or trailing end portion 34 of the tube is snugly and retentively fitted over the shank and is slightly expanded to provide a reduction or shoulder in the tube at the forward end of the shank. The rearward end of the portion 34 abuts the shoulder 32. The external surface of the shank is provided with a plurality of nicks 38 which constitute anti-slipping detents for the portion 34 thus insuring a reliable and satisfactory joint between the shank 30 and the tube portion 34. It might be stated in this connection that the fitting has a restricted bore (FIG. 9) as at 40 and a counterbore 42 which is circular in cross-section and constitutes an adapter for the male coupling 44 on the end of a fluid hose or conduit 46. This same construction serves to accommodate the conical portion of the fitting 48 on the inner rigid intravenous needle as shown in the assembly seen in FIG. 3. This fitting 48 which is like the fitting 18 and need not be described, it is believed, in detail. The forward end is provided with a rigid tubular metal needle 50 which is of a length, obviously, greater than the flexible needle or cannula 14. This needle 50 is also referred to as a rigid metal stylet to assist in distinguishing between the two inner and outer needles. It will also be evident from FIG. 3 that the mitered or pointed leading end 52 of the stylet or needle projects through and beyond the truncated end 22 of the flexible needle, that is when the needles are assembled for use as depicted in FIG. 3.

With reference now to FIGS. 10, 11 and 12 it will be seen that the rigid metal or equivalent fitting is denoted at 56 and has a body portion 58, a neck 60 at the right and a conical reduced extension 62 at the left providing a shoulder 64 (FIG. 11) and joined with the axially aligned hollow extension constituting a shank 66 for the embracing end portion 68 of the plastic cannula 70. Here again detents 72 are provided to facilitate a satisfactory coupling between 66 and 68. The improvement here is in respect to the retaining sleeve 74 which is also of a suitable elastic plastic material, said sleeve embracing the tube-portion 66. The sleeve extends from the end 76 adjacent the shoulder 64 to and beyond the free end of the shank and beyond the bend 78 and provides a snug fitting and reinforcing collar, as it were, for the plastic cannula as at 80. Experience has shown that this snug fitting sleeve constitutes a reliable ferrule serving in what is believed to be a self-evident manner. As also seen in FIG. 11, the numeral 82 designates a hollow rigid needle or stylet. These several views are sufficient to comprehensively disclose this embodiment of the over-all single inventive concept.

FIGS. 1, 7, 8 and 9 considered in the order drawn will enable the reader to follow the initial injecting step, the next and succeeding step depicted in FIG. 7.

For difficult venipunctures, after the plastic cannula has entered the lumen of the vein, FIG. 8 in particular the stylet needle is withdrawn approximately one-quarter of an inch and, with a slight forward pressure on the hub or body of the fitting 18 the plastic cannula is advanced into the vein a desired distance. The leading end 20 and 22 facilitates in this accomplishment.

The instrumentality may be sterilized in an autoclave in the manner followed in sterilizing an ordinary needle. It may be desirable to place the needle, before sterilization in a constricted test tube loosely stoppered with cotton to protect the point of the needle and especially the feather-like lip or tip 22 at the end 20 of the plastic cannula.

It may be added to determine when the needle is properly in the lumen of the vein it is necessary that blood be allowed to pass through the needle so that it may be observed by the user. It may be further added that the slightly larger cross-section of the end 80 of the sleeve 74 permits said end to serve as a check shoulder.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An intravenous needle assembly comprising a hollow hypodermic needle having a shank with a smooth, unbroken and unobstructed exterior surface together with a pointed end, a flexible and non-toxic cannula tightly embracing and removably mounted upon said shank and adapted to be inserted into tissues with said needle and to remain in inserted position in said tissues upon withdrawal of said needle, said cannula having a forward end terminating in a feather edged lip disposed closely adjacent to and disposed rearwardly of said pointed end.

2. The combination of claim 1 including a rigid hollow fitting adapted for connection to a hose and the like, said fitting having a hollow tapering tubular projection upon which the rear end of said cannula is embracingly engaged.

3. The combination of claim 2 including a shoulder on said tubular projetcion against which the adjacent rear end of said cannula is abutted.

4. The combination of claim 3 wherein said tubular portion has exterior surface irregularities thereby effecting a gripping action with the embracing portion of said cannula.

5. The combination of claim 4 including an elastic sleeve comprising a ferrule and compressively encasing the rear end of said cannula.

6. The combination of claim 1 including a rigid hollow fitting adapted for connection to a hose and the like, said fitting having a hollow tapering tubular projection upon which the rear end of said cannula is embracingly engaged and including an elastic sleeve comprising a ferrule and compressively encasing the rear end of said cannula.

7. The combination of claim 1 including a rigid hollow fitting adapted for connection to a hose and the like, said fitting having a hollow tapering tubular projection upon which the rear end of said cannula is embracingly engaged, and wherein said tubular portion has exterior surface irregularities thereby effecting a gripping action with the embracing portion of said cannula.

8. The combination of claim 1 including an elastic sleeve comprising a ferrule and compressively encasing the rear end of said cannula.

References Cited in the file of this patent

UNITED STATES PATENTS

| | | |
|---|---|---|
| 2,256,656 | Swabacker | Sept. 23, 1941 |
| 2,346,334 | Shaw | Apr. 11, 1944 |
| 2,389,355 | Goland et al. | Nov. 20, 1945 |
| 2,770,236 | Utley | Nov. 13, 1956 |
| 2,828,744 | Hirsch et al. | Apr. 1, 1958 |

FOREIGN PATENTS

| | | |
|---|---|---|
| 177,876 | Austria | Mar. 10, 1954 |
| 1,092,011 | France | Nov. 3, 1954 |
| 843,744 | Great Britain | Aug. 10, 1960 |